(12) United States Patent
Yao (10) Patent No.: US 7,058,615 B2
(45) Date of Patent: Jun. 6, 2006

(54) SCHEDULING FOR DATA WAREHOUSE ETL PROCESSING AND DATA MINING EXECUTION

(75) Inventor: Albert Zhongxing Yao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 10/422,675

(22) Filed: Apr. 24, 2003

(65) Prior Publication Data

US 2004/0215584 A1    Oct. 28, 2004

(51) Int. Cl.
*G06F 15/18* (2006.01)
*G06F 17/30* (2006.01)

(52) U.S. Cl. ........................................ 706/12; 707/204
(58) Field of Classification Search ................. 706/12; 707/100, 1–10, 204
See application file for complete search history.

(56) References Cited

U.S. PATENT DOCUMENTS

| 5,787,425 | A | 7/1998 | Bigus ............................ 707/6 |
| 6,151,608 | A | 11/2000 | Abrams ....................... 707/204 |
| 6,167,405 | A | 12/2000 | Rosensteel, Jr. et al. .... 707/102 |
| 6,208,990 | B1 | 3/2001 | Suresh et al. ................... 707/6 |
| 6,212,526 | B1 | 4/2001 | Chaudhuri et al. .......... 707/102 |
| 6,381,619 | B1 | 4/2002 | Borowsky et al. ........... 707/204 |
| 6,470,333 | B1 * | 10/2002 | Baclawski ...................... 707/3 |
| 6,496,815 | B1 * | 12/2002 | Kawashima .................. 706/35 |
| 6,651,062 | B1 * | 11/2003 | Ghannam et al. ............. 707/10 |
| 6,895,411 | B1 * | 5/2005 | Keller .......................... 707/200 |
| 2002/0138492 | A1 * | 9/2002 | Kil ............................... 707/100 |

OTHER PUBLICATIONS

A reusable distributed software architecture driven by metadata Marino, P.; Siguenza, C.; Nogueira, J.; Poza, F.; Dominguez, M.; Software Engineering Conference, 1999. (APSEC '99) Proceedings. Sixth Asia Pacific Dec. 7-10, 1999 pp.: 246-249.*

(Continued)

*Primary Examiner*—Anthony Knight
*Assistant Examiner*—Michael B. Holmes
(74) *Attorney, Agent, or Firm*—John Biggers Biggers; Mark S. Walker; Biggers & Obanian, LLP (57) ABSTRACT

Providing flexibility in scheduling control for an extract, transfer, and load ("ETL") scheduler in a data warehouse system, including extracting from a computer memory of the data warehouse system a dependent condition for a scheduled ETL processing step of the ETL scheduler, extracting from computer memory related ETL data for the dependent condition, determining whether the ETL data satisfies the dependent condition, and executing the scheduled step if the ETL data satisfies the dependent condition. A sub-scheduler typically is implemented as an interface between an ETL scheduler and external programs without modification of the ETL scheduler. In typical embodiments, an ETL scheduler includes a multiplicity of scheduled ETL processing steps, and computer memory of a data warehouse system includes dependent conditions for at least one of the scheduled ETL processing steps and ETL data related to at least one dependent condition.

24 Claims, 4 Drawing Sheets

OTHER PUBLICATIONS

The role of tools in development of a data warehouse McCabe, M.C.; Grossman, D.; Assessment of Software Tools, 1996., Proceedings of the Fourth International Symposium on May 22-24, 1996 pp.: 139-145.*

An event driven software architecture for enterprise-wide data source integration Marino, P.; Siguenza, C.; Nogueira, J.; Poza, F.; Dominguez, M.; Information Technology: Coding and Computing, 2000. Proceedings. International Conference on pp.: 27-29.*

"Partial Stepwise Regression for Data Mining" DE920000016. (Abstract).

* cited by examiner

SCHEDULING FOR DATA WAREHOUSE ETL PROCESSING AND DATA MINING EXECUTION

BACKGROUND OF THE INVENTION

1. Field of the Invention

The field of the invention is data processing, or, more specifically, methods, systems, and products for scheduling for data warehouse ETL (extract, transfer, and load) processing and data mining execution.

2. Description of Related Art

A data warehouse is a collection of data designed to support management decision making. Data warehouses contain a wide variety of data intended to support development of management reports or data mining models depicting business conditions at a particular point in time. Data warehouse systems include systems to extract data from business applications and a warehouse database system to which the extracted data is transferred and loaded in an organized fashion so as to provide business managers useful access to the data. Data warehouses generally combine data extracted from many different databases across an entire enterprise. The data processing requirements of extracting data from many databases, transferring it across an enterprise, and loading it meaningfully into a data warehouse are typically large.

Data warehouse systems typically carry out many ETL (Extract, Transfer and Load) processing steps to populate data warehouse tables. In order to populate the data warehouse tables properly, the execution of these steps is typically linked in a predefined order. In typical data warehouse systems, a warehouse scheduler ("ETL scheduler") starts execution of a first ETL step, then the execution of the other steps is followed according to a pre-defined sequence.

ETL processing in data warehouse systems is typically implemented as a combination of a fixed schedeule of ETL processing steps and external programs for carrying out the ETL processing steps. An ETL scheduler reads the steps from a schedule and calls external program in sequence according to the schedule. For most data warehouse systems, the execution of a next step in ETL processing is based on a limited set of predefined conditions, such as on-success, on-failure or on-completion of the previous steps. There is no flexibility of how the execution sequence and execution frequency can be controlled by the characteristics of the external programs. All linked steps must be executed in the same frequency. However, in some cases, some steps may need to be executed less frequently than the overall schedule itself. Some steps may have dependency on the schedule of other steps, or some steps may need to be executed based upon some other external conditions.

For example, the execution of data mining operations may need a schedule different from a default daily ETL schedule. A step for data mining model training is usually very time consuming. A default daily scheduling of ETL processing for model training can represent a large processing burden with respect to the overall ETL schedule. It can be useful to carry out mining training only weekly or biweekly. An ETL step for loading mining data may not need to be executed if mining training and mining apply are not to be executed. If a model training step is not executed, then a post processing step for developing a mining model result also may not need to be executed. However, these scheduling control can not be achieved by typical prior art warehouse ETL scheduling systems.

It would be advantageous to have improved methods of providing flexibility in scheduling of ETL processing steps for data warehouse systems. In addition, because of the complexity of data warehouse systems, it would also be advantageous if addition flexibility could be provided with a reduced need, or, even better, no need, to modify existing scheduling systems.

SUMMARY OF THE INVENTION

Exemplary embodiments of the invention include methods for providing flexibility in scheduling control for an extract, transfer, and load ("ETL") scheduler in a data warehouse system. Exemplary embodiments include extracting from a computer memory of the data warehouse system a dependent condition for a scheduled ETL processing step of the ETL scheduler, and extracting from computer memory related ETL data for the dependent condition. Such embodiments include determining whether the ETL data satisfies the dependent condition, and executing the scheduled step if the ETL data satisfies the dependent condition.

In exemplary embodiments of the invention, steps of the method are carried out through a sub-scheduler implemented as an interface between the ETL scheduler and external programs without modification of the ETL scheduler. In such embodiments, the ETL scheduler includes a multiplicity of scheduled ETL processing steps, and the computer memory of the data warehouse system includes dependent conditions for at least one of the scheduled ETL processing steps and ETL data related to at least one dependent condition. Such embodiments include repeating for each dependent condition for each scheduled ETL processing step for which the operations database has at least one dependent condition the steps of extracting from computer memory a dependent condition for a scheduled ETL processing step of the ETL scheduler, extracting from computer memory related ETL data for the dependent condition, determining whether the ETL data satisfies the dependent condition, and executing the scheduled step if the ETL data satisfies the dependent condition.

Exemplary embodiments of the invention include storing ETL data in computer memory. Dependent conditions can include time dependent conditions. Dependent conditions can include system dependent conditions. Related ETL data can include extract time data. Related ETL data can include extract system data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for data warehouse ETL processing and data mining execution. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute" are used as synonyms, referring to individual elements of digital data. Aggregates of data elements are referred to as "records" or "data structures." Aggregates of records are referred to as "tables." Aggregates of tables are referred to as "databases." Definitions of complex data structures that include member methods, functions, or software routines in addition to data elements are referred to as "classes." Instances of complex data structures are referred to as "objects" or "class objects."

"Data mining" is an analytic technique to dynamically discover patterns in historical data records and to apply properties associated with these records to production data records that exhibit similar patterns. Based on historical data, a data mining algorithm first generates a data mining model that captures the discovered patterns; this activity is called "model training." The data mining model so generated is then applied on production data; this activity is called "model scoring."

Flexibly Scheduling For ETL Processing

Figure 1:
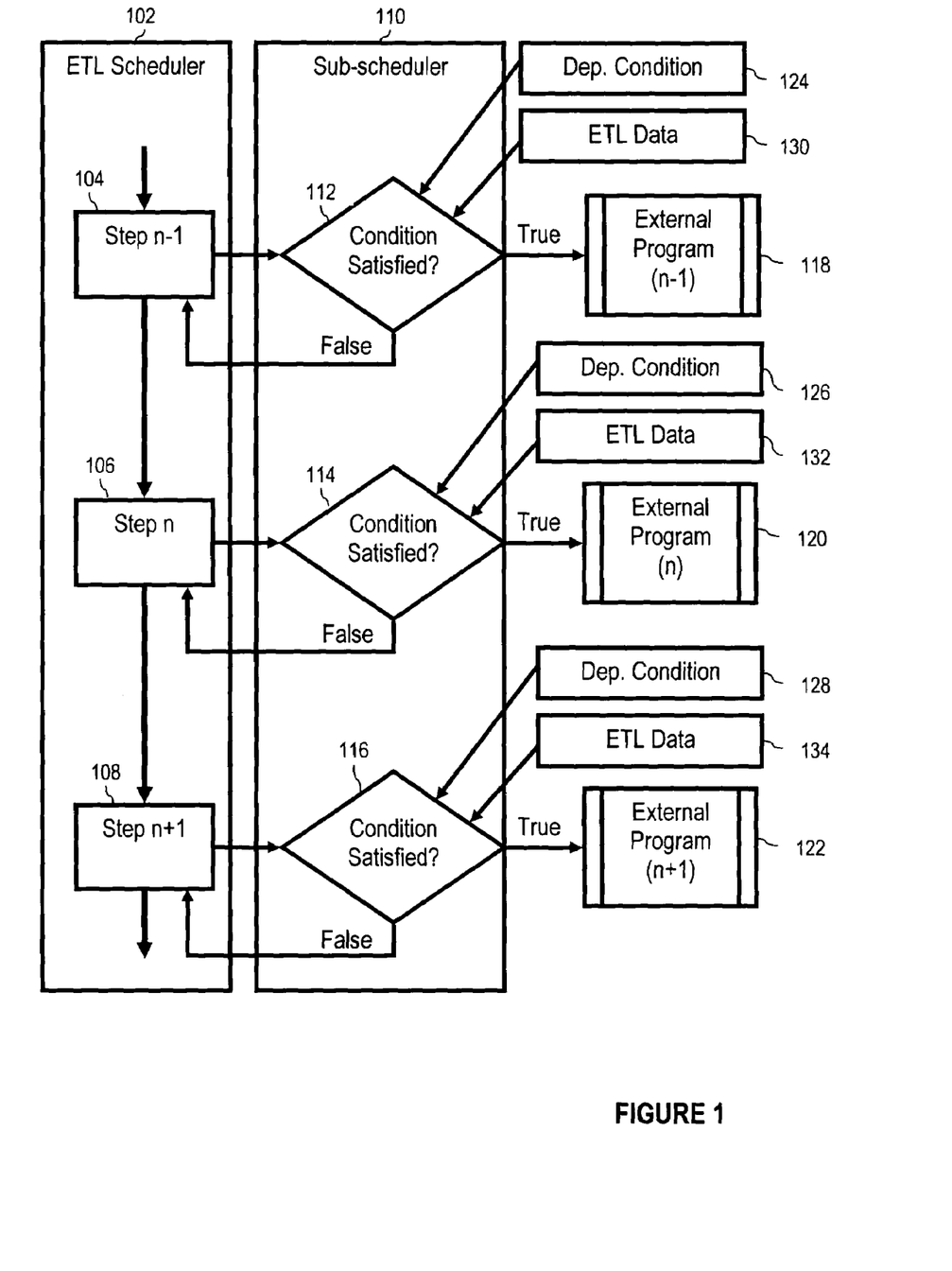
FIG. 1 sets forth a block diagram of an exemplary system architecture useful in various embodiments of the present invention.

FIG. 1 sets forth a block diagram of an exemplary system architecture useful in various embodiments of the present invention. As shown in the exemplary architecture of FIG. 1, methods for providing flexibility in scheduling control for an extract, transfer, and load ("ETL") scheduler (102) in a data warehouse system (202), are implemented through a sub-scheduler (110) implemented as an interface between the ETL scheduler (102) and external programs (118, 120, 122). In typical embodiments, scheduled ETL processing steps are carried out by calls to external programs. The calls to the external programs are scheduled by schedule data in the scheduler, and the actual work of extracting data, transferring data, and loading warehouse data is carried out by the external programs.

In typical embodiments, the implementation of a sub-scheduler as an interface between a scheduler and its external programs enables the additional of scheduling flexibility to an ETL scheduler without modification of the ETL scheduler. Such an interface is implemented in some systems according to embodiments of the present invention by removing an external program to a new storage location on a file system and replacing it with a sub-scheduler program having the same executable filename as the external program, so that the ETL scheduler never even knows that a sub-scheduler has been inserted between the ETL scheduler and its external program. Then the ETL scheduler's usual call to its external program results in a call to the sub-scheduler which then carries out the additional processing steps comprising additional scheduling flexibility, all with no change whatsoever to the ETL scheduler.

An alternative way of implementing a sub-scheduler as an interface is to change data-driven parameters in an ETL scheduler without otherwise modifying the scheduler. That is, to the extent that external program names are input table data read by an ETL scheduler, external program names are replaced in some embodiments by sub-scheduler program names, so that the scheduler is directed in a data-driven fashion to call a subscheduler instead of a particular external program. In such embodiments, the subscheduler in turn calls (or does not call, according to its logic) the external program, all completely transparent to the normal functioning of the ETL scheduler.

Figure 2:
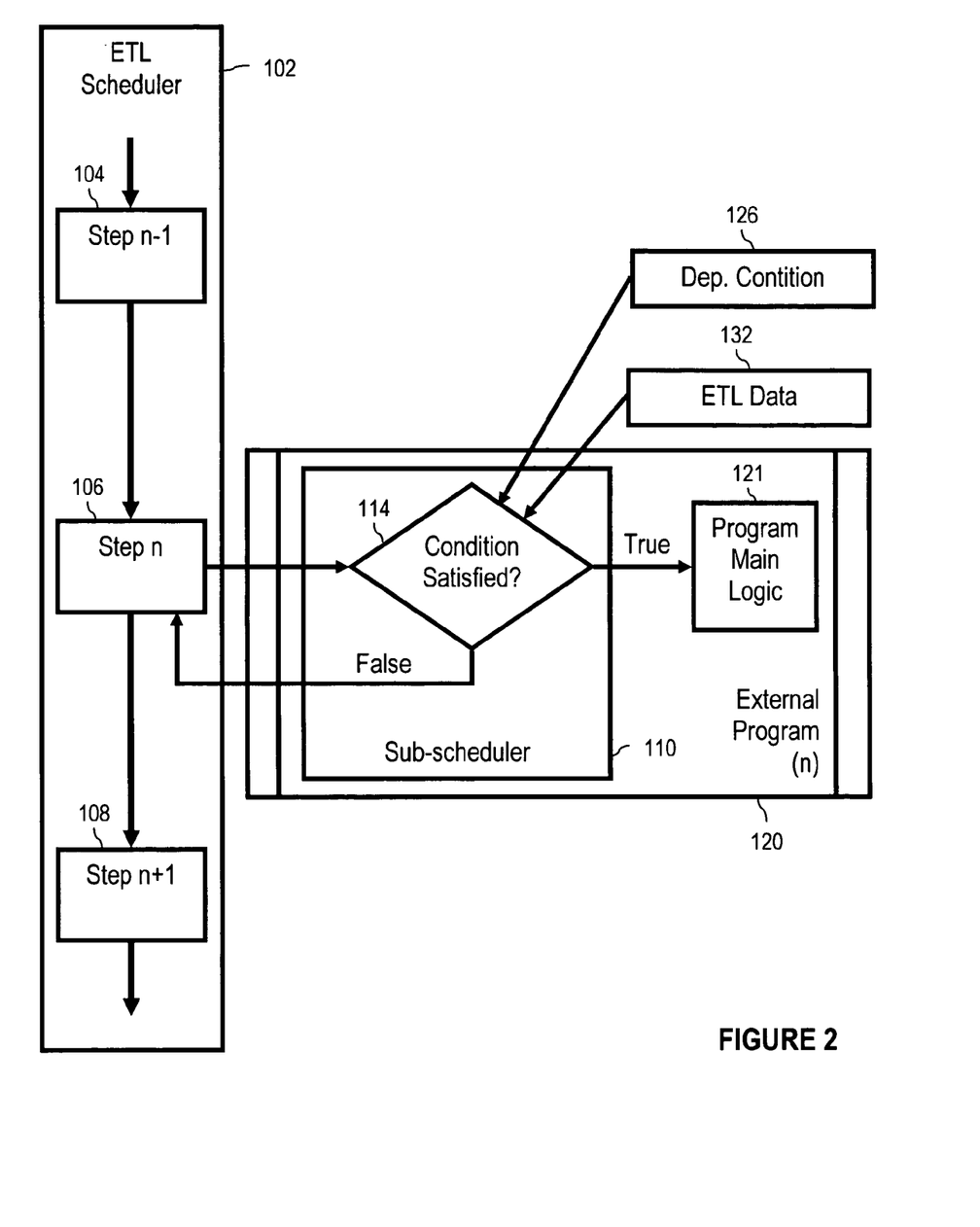
FIG. 2 sets forth a block diagram of an exemplary system architecture useful in various embodiments of the present invention.

Another alternative way of implementing a sub-scheduler as an interface is to incorporate the interface directly into an external program. This alternative is illustrated by the exemplary architecture set forth in FIG. 2, where a sub-scheduler (110) is incorporated directly into an external program (120) by being coded and compiled as part of the external program itself. In embodiments that utilize this alternative, no changes at all are required in the ETL scheduler (102), neither programming changes nor data-driven changes, because the program name of the external program, called by the ETL scheduler, can be left unchanged.

A third alternative method for implementing a sub-scheduler as an interface is useful in object-oriented environments, where external programs are member methods in class objects, and an interface for a sub-scheduler can be implmented as the so-called 'adapter design pattern' for object-oriented programming in which a sub-scheduler interface is implemented to provide the external program interface expected by an ETL scheduler, so that the ETL scheduler works together with the sub-scheduler just as it would with the external program, again, without ever knowing that the sub-scheduler has been inserted as an interface between the ETL scheduler and the external program. In addition to the four methods of interfacing just described, other methods of implementing a sub-scheduler as an interface between an ETL scheduler and external programs will occur to those of skill in the art, and all such methods are well within the scope of the present invention.

To optimize scheduling control of an existing ETL schedule, an implementation of a sub-scheduler can be attached to any ETL processing step capable of benefitting from special schedule controls. The architecture of FIG. 1 shows three ETL processing steps (104, 106, 108), each of which is coupled through a sub-scheduler (110) to external programs (118, 120, 122). The illustration in FIG. 1 of three processing steps is for explanation only, not a limitation of the present invention. On the contrary, many systems providing additional scheduling flexibility according to embodiments of the present invention will comprise many ETL processing steps. In addition, the illustration of each ETL processing step coupled to a sub-scheduler also is for explanation only, not for limitation. There is no requirement in the present invention that any particular processing step be coupled to a sub-scheduler for additional scheduling flexibility. In typical embodiments, a sub-scheduler interface is inserted for the ETL processing steps that can benefit from additional scheduling flexibility and not inserted where it is not needed.

In operation, a sub-scheduler according to typical embodiments of the present invention checks execution conditions based on information in computer memory, such as an operation database, and determines whether execution of an ETL processing step needs to be done or not. In the example of FIG. 1, execution conditions are dependent conditions (124, 126, 128) and determining whether to execute a particular ETL processing steps is carried out by comparison (112, 114, 116) of dependent conditions with historical ETL data (130, 132, 134). If a condition check indicates that the execution schedule conditions, that is, the 'dependent conditions,' are not met, that is, not met by the ETL data, the execution of an associated external program is skipped and the scheduler proceeds to a next ETL processing step in its scheduled execution sequence. If a condition check indicates that execution scheduler conditions are satisfied, the sub-scheduler directs execution of an appropriate external program. Based on this method, the overall ETL execution sequences remains unchanged. The sub-scheduler adds additional control to the existing ETL schedule and offsets a predefined ETL processing schedule based on the dependent conditions and historical ETL data from, for example, an operation database.

By way of further explanation, consider an example in which an execution frequency of a main ETL scheduler is $T_{main}$, the execution frequency for a sub-scheduler is $T_{sub}$. Then, if a governing dependnet conditions is taken as m $T_{main} < T_{sub} <= (m+1) T_{main}$, the actual execution of frequency of execution of any particular ETL processing step will be $(m+1) T_{main}$, where m is the number of ETL executions.

Sub-schedulers according to embodiments of the present invention typcially comprise sets of dependent conditions which can be predefined by users externally, that is, for example, just typed into tables through a text editor, word processor, or any data entry program as will occur to those of skill in the art. Types of dependent conditions include time dependent conditions and system dependent conditions. Time dependent conditions are dependent conditions that mainly depend on aspects of time, such as, for example, a current execution time, previous execution times, and predetermined frequencies. A time dependent condition can be defined as fulfilled when, for example:

$$T_{current} - T_{previous} \geq T_{frequency}$$

where:
 $T_{current}$ represents current extraction time,
 $T_{previous}$ represents previous extraction time, and
 $T_{frequency}$ represents extraction frequency.

For further explanation, consider an example regarding scheduling for data mining operations. Execution of data mining related operations, such as model training and model apply, are examples of data warehouse ETL processing steps that often requires large amounts of data processing time. Mining related operations, however, are also examples of ETL processing steps that may not need to be executed as frequently as a regular ETL schedule. For a mining model to be trained not less than every two weeks, an exemplary time dependent condition for a mining model training step can be implemented as:

$$T_{current} - T_{previous} \geq T_{frequency} = 14 \text{ days}$$

where:
 $T_{current}$ represents current extraction time cutoff timestamp,
 $T_{previous}$ represents previous timestamp of the last successful model training and
 $T_{frequency}$ represents mining model training frequency.

System dependent conditions are conditions dependent on an extraction system or other extraction steps, such as the successful execution of previous steps, or whether there is data needed for execution of a step. In an exemplary sub-scheduler where whether an ETL processing is executed depends upon the presence of input data needed for training data mining models to be populated in table_1, table_2, . . . , table_n−1, table_n, table_n+1, and so on, exemplary system dependent conditions for a data mining model training step can be implemented as:

Row count for table_1>minimum data rows needed
 Row count for table_2>minimum data rows needed . . .
 Row count for table_n−1>minimum data rows needed
 Row count for table_n+>minimum data rows needed
 Row count for table_n+1>minimum data rows needed
And so on . . .

Figure 3:
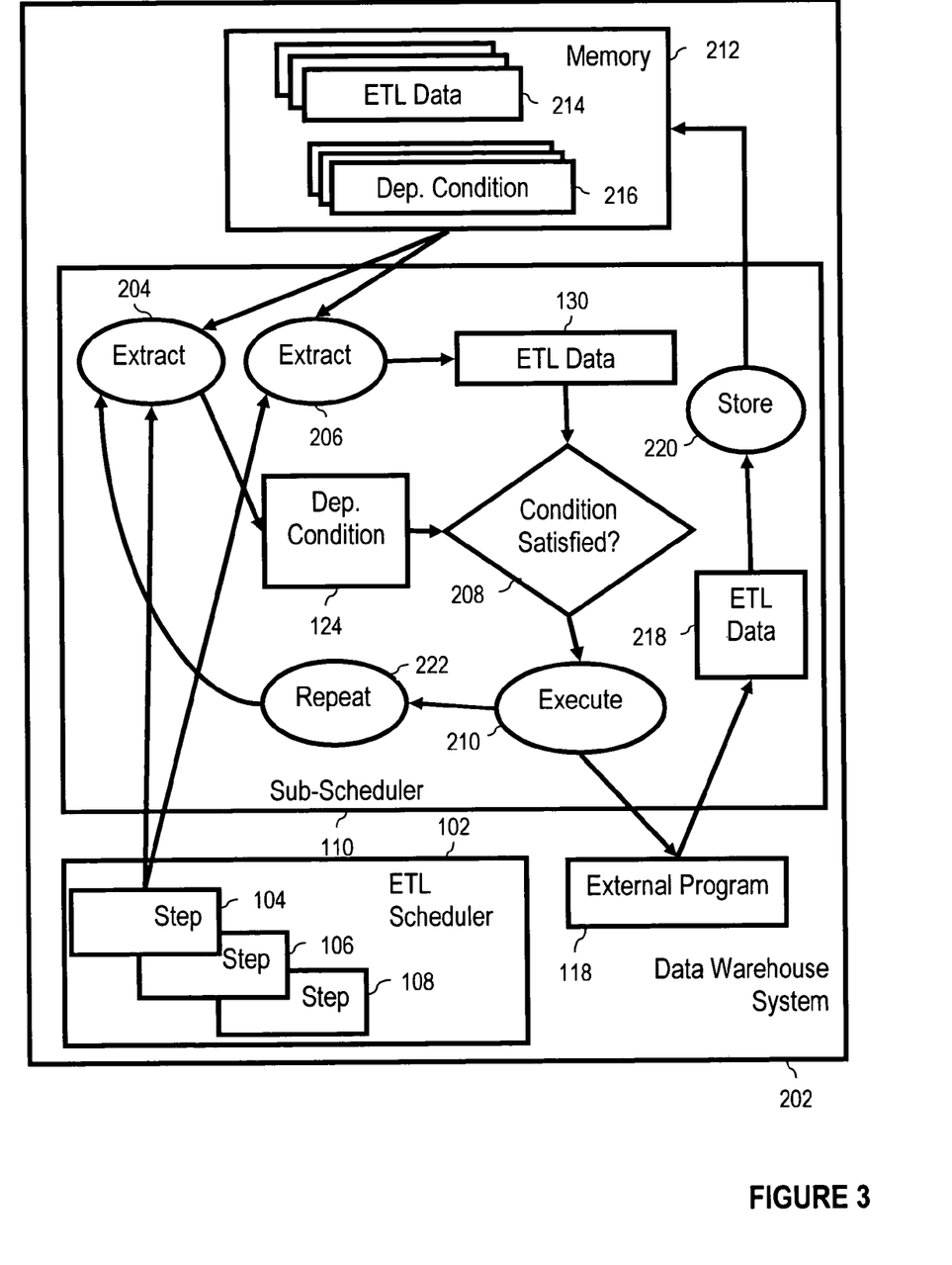
FIG. 3 sets forth a data flow diagram illustrating an exemplary method for providing flexibility in scheduling control for an extract, transfer, and load ("ETL") scheduler in a data warehouse system.

FIG. 3 sets forth a data flow diagram illustrating an exemplary method for providing flexibility in scheduling control for an extract, transfer, and load ("ETL") scheduler (102) in a data warehouse system (202). The method of FIG. 3 includes extracting (204) from a computer memory (212) of the data warehouse system (202) a dependent condition (124) for a scheduled ETL processing step (104) of the ETL scheduler (102). Computer memory includes any machine readable memory, such as, for example, random access memory, read only memory, magnetic and optical disk drives, and so on, as will occur to those of skill in the art. In this disclosure, concerned with data warehouse systems, computer memory is often exemplified as an operation database in a data warehouse system. A dependent condition is typically implemented as a data structure representing the dependent condition, including data identifying a scheduled ETL processing step for which the dependent condition is used to provide additional scheduling flexibility. The data identifying a scheduled ETL processing step is referred to as a step identification or 'stepID' field. StepID fields often are implemented as fields in records in tables where each record represents a dependent condition.

The method of FIG. 3 also includes extracting (206) from computer memory (212) related ETL data (130) for the dependent condition (124). ETL data (130) typically comprises historical or factual information described results of previous ETL processing steps or current conditions of a data warehouse. Like dependent conditions, ETL data is typically stored in tables where each record in a table represents a particular ETL datum. Such records often are implemented so as to include a stepID field which is used as a foreign key to relate ETL data records in ETL data tables in a database to dependent condition records. That is, such exemplary structures support the extraction of 'related' ETL data for a dependent condition, identifying the 'related' quality of ETL data by its possession of a particular stepID.

The method of FIG. 3 includes determining (208) whether the ETL data (130) satisfies the dependent condition (124). For explanation, consider the following exemplary dependent condition table:

| StepID | CondID | Condition |
|--------|--------|-----------|
| S-01 | C-01 | Table X1 has more than 3000 rows loaded |
| S-01 | C-02 | Table X2 has more than 4000 rows loaded |
| S-02 | C-03 | Table Y1 has more than 2000 rows loaded |
| S-03 | C-04 | Table Z1 has more than 1000 rows loaded |
| S-03 | C-05 | Table Z2 has more than 1500 rows loaded | and the following exemplary ETL data table:

| CondID | ETL Data |
|--------|----------|
| C-01 | Table X1 has 3500 rows loaded |
| C-02 | Table X2 has 4500 rows loaded |
| C-03 | Table Y1 has 2500 rows loaded |
| C-04 | Table Z1 has 1250 rows loaded |
| C-05 | Table Z2 has 1500 rows loaded |

In this example, tables X1 and X2 were previously loaded respectively with 3000 rows and 4000 rows of warehouse data, the ETL processing step identified by stepID=S-01 was executed, and system dependent conditions were stored indicating that in future operations, the ETL processing step S-01 is not to be executed until more data is loaded into tables X1 and X2. That is, this first exemplary system dependent condition commemorates the fact that in this example step S-01 has already been implemented for the 3000 rows of data already loaded in table X1 and for the 4000 rows of data already loaded into table X2, and there is no need to repeat the step until more data is added. Similarly, according to this exemplary dependent condition table, step S-02 is not be executed until more than 2000 rows are loaded into table Y1, and step S-03 is not to be executed until more than 1000 rows are in table Z1 and more than 1500 rows are in table Z2.

The exemplary ETL data table is related to the exemplary dependent condition table through a common condition identification field named 'condID' used as a foreign key. The ETL data in the exemplary ETL data table indicates the current condition of the same tables in the same exemplary data warehouse. That is, the ETL data in the exemplary ETL data table indicates that in fact table X1 has 3500 rows loaded and table X2 has 4500 rows loaded, so that in view of the dependent conditions exemplified above, which require more than 3000 rows for table X1 and more than 4000 rows for table X2, on the next run of the data warehouses scheduler, in this example, step S-01 will be executed. Similarly, because in fact Table Y1 has 2500 rows loaded, where the dependent condition for step S-02 requires more than 2000 rows for table Y1, on the next run of the data warehouse scheduler, step S-02 will be executed. Step S-03, however, would not be executed by a scheduler run at this time because, although its dependent condition requiring more than 1000 rows in table Z1 is met, its dependent condition requiring more than 1500 rows in table Z2 is not met. That is, on a previous execution of step S-03, 1500 rows of data were present in table Z2. Step S-03 at that previous time was executed against those 1500 rows. In this example, it is not useful to execute step S-03 again until more data is loaded into table Z2.

The method of FIG. 3 includes executing (210) the scheduled step (104) if the ETL data satisfies the dependent condition. In many typical embodiments of sub-schedulers according to the present invention, executing a scheduled step includes returning a logical TRUE to the calling ETL scheduler if the ETL data satisfies the dependent condition and returning FALSE if the ETL data does not satisfy the dependent condition. As described above, in typical embodiments, executing (210) a scheduled ETL processing step comprises executing an external program (118).

In methods implemented according to the example of FIG. 3, a dependent condition (124) often comprises a time dependent condition. Also in methods implemented according to the example of FIG. 3, a dependent condition (124) often comprises a system dependent condition. In any sub-scheduler according to the method of FIG. 3, dependent conditions can comprise both time dependent conditions and system dependent conditions. In any sub-scheduler according to the method of FIG. 3, dependent conditions, even for a particular ETL processing step, can comprise both time dependent conditions and system dependent conditions. In methods implemented according to the example of FIG. 3, related ETL data (130) often comprises extract time data and related ETL data (130) often comprises extract system data.

In typical embodiments according to the example of FIG. 3, an ETL scheduler (102) comprises a multiplicity of scheduled ETL processing steps (104, 106, 108), and the computer memory (212) of the data warehouse system (202) comprises dependent conditions (216) for at least one of the scheduled ETL processing steps (104, 106, 108) and ETL data (214) related to at least one dependent condition. In such embodiments, the illustrated method typically also includes repeating (222), for each dependent condition for each scheduled ETL processing step for which the operations database has at least one dependent condition, the steps of extracting (204) from computer memory a dependent condition for a scheduled ETL processing step of the ETL scheduler; extracting (206) from computer memory related ETL data for the dependent condition; determining (208) whether the ETL data satisfies the dependent condition; and executing (210) the scheduled step if the ETL data satisfies the dependent condition.

The repetitive aspect of sub-scheduler processing according to embodiments of the present invention is further explained by use of the following segment of pseudocode:

```
stepID thisStepID = StepID_of_Current_ETL_Processing_Step;
conditionRecord thisConditionRecord;
ETLDataRecord = thisETLRecord;
ConditionIdentification thisCondID;
boolean satisfied = true;
thisConditionRecord = findFirst(conditionRecord where
conditionRecord.stepID equals
    thisStepID);
while(thisConditionRecord.stepID equals thisStepID && satisfied) {
    thisETLRecord = find(ETLDataRecord where
    ETLDataRecord.condID equals
        thisConditionRecord.condID);
```

-continued

```
   satisfied = compare(thisETLRecord.ETLData,
      thisConditionRecord.condition);
   // move to next dependent condition, if there is one
   thisConditionRecord = findNext(conditionRecord where
      conditionRecord.stepID
         equals thisStepID);
}
if(satisfied) {
   // execute the external program for the current ETL processing step
   system(externalProgram);
   return(TRUE):
}
else return(FALSE);
```

This example code segment is said to be 'pseudocode' because it is a form of computer code that matches no particular programming language and is therefore used only for explanation. This example operates against the stepID of a current ETL processing step of a data warehouse scheduler:

stepID
thisStepID=StepID_of_Current_ETL_Processing_Step;

The example code segment operates on dependent condition tables and ETL data tables of the kind exemplified above, that is, having records related through a stepID field. The example code segment proceeds by calling:

thisConditionRecord=findFirst(conditionRecord where conditionRecord.stepID equals thisStepID);

to find a first dependent condition record having the same stepID as the current ETL processing step. The example code segment then calls:

thisETLRecord=find(ETLDataRecord where ETLDataRecord.condID equals thisConditionRecord.condID);

to find an ETL data record having a condID that matches the condition identifier on the current condition record. The example code segment then calls:

satisfied=compare(thisETLRecord.ETLData, thisConditionRecord.condition);

to determine whether ETL data in the found ETL data record satisfies the dependent condition stored in the first found condition record. The compare( ) function returns a boolean TRUE if the ETL data satisfies the dependent condition, otherwise return FALSE. The example code segment uses a while( ) loops to examine each condition record with a matching stepID and, for each such condition record, an ETL record with a matching condID. The code segment begins with the boolean element 'satisfied' set to TRUE. If any ETL data related to any dependent condition fails to satisfy the condition as calculated by the compare( ) function, 'satisfied' is set to FALSE, the while( ) loop processing ceases, and the example code segment returns control to the calling scheduler without executing an external program for the current ETL processing step and with a return value set to FALSE. If all found ETL data records satisfy their related dependent conditions, the while( ) loop finishes processing with 'satisfied' still set to TRUE, the code segment executes an appropriate external program, and returns with a return value of TRUE.

Methods implemented according to FIG. 3 typically also include storing (220) ETL data in computer memory. For time dependent data comprising, for example, a previous execution time, a current execution time, and an execution frequency, in sub-scheduler processing where ETL data satisfies a time dependent condition and processing continues by executing (210) a scheduled step (104), methods of processing according to embodiments of the present invention typically include storing the current execution time as a previous execution time for future processing. Similarly, for system dependent data comprising, for example, a previous row count for a record type, in sub-scheduler processing where ETL data satisfies a system dependent condition and processing continues by executing (210) a scheduled step (104) that results in loading additional rows of data for that record type, methods of processing according to embodiments of the present invention typically include storing the new row count as a previous row count for future processing.

There is no limitation in the current invention that an ETL processing step is controlled by only one dependent condition. On the contrary, many ETL processing steps are controlled by more than one dependent condition. For explanation, consider the following exemplary dependent condition tables:

| StepID | CondID | CondType | ParamId | ParamValue |
|---|---|---|---|---|
| 10 | 101 | 1 | 1 | 2003-04-21-14.48.17.000000 |
| 10 | 101 | 1 | 2 | 14 |
| 10 | 102 | 3 | 1 | SALES |
| 10 | 102 | 3 | 2 | 1000 |

| CondTypeID | CondTypeDesc |
|---|---|
| 1 | Time dependent Condition |
| 3 | System dependent Condition for minimun row checking |

| CondTypeID | ParamId | ParamDesc |
|---|---|---|
| 1 | 1 | Previous extraction time |
| 1 | 2 | Extraction frequency |
| 3 | 1 | Table Name |
| 3 | 2 | Minimun Rows |

Such dependent condition tables can be created by use of Data Definition Language ("DDL") scripts such as the following:

```
create table CONDTYPEDESC (
   condtypeid       integer not null,
   condtypedesc     varchar(128),
   primary key (condtypeid)
);
create table PARAMDESC (
   condtypeid       integer not null,
   paramid          integer not null,
   paramdesc        varchar(128),
   primary key (condtypeid,paramid)
);
Create table DEPENDCONDS (
   Stepid           integer not null,
   Condid           integer not null,
   Condtypeid       integer,
   Paramid          integer not null,
   Paramdesc        varchar(128),
   Paramvalue       varchar(128),
Primary key (stepid, condid, paramid)
)
```

In operation, a sub-scheduler operating on this kind of dependent condition table checks whether dependent conditions are met for more than one type of condition. These exemplary dependent condition tables present two condition types for one ETL processing step. More particularly, in this example, ETL processing step '10' has two dependent conditions: one dependent condition of type '1' and another of type '3'. Dependent condition type '1' is a time dependent condition having parameters 'previous extraction time' and 'extraction frequency.' The previous extraction time is recorded as '2003-04-21-14.48.17.000000', and the extraction frequency is recorded as '14,' that is, 14 days, that is, bi-weekly. At run time, an exemplary sub-scheduler using this example table reads the current date from a computer system clock, and if, for example, the current date is less than 14 days since the previous extraction time, the sub-scheduler exits with its return value set to FALSE and does not execute its external program.

Dependent condition type '3' in this example is a system dependent condition for a minimum number of rows in a table. In this example, the table to be checked for this exemplary ETL processing step is a table named 'SALES,' and the dependent condition is that in order for the external program to be called, SALES must contain more than 1000 rows of data. At run time, an exemplary sub-scheduler using this example table reads the current row count for SALES from its operations database and and if, for example, the current row count is less equal to or less than 1000, the sub-scheduler exits with its return value set to FALSE and does not execute its external program. This example, illustrates processing for an ETL processing step in dependence upon more than one dependent condition. That is, in order for a sub-scheduler to call its external program in this example, both dependent conditions must be met: The extraction frequency must be no more than bi-weekly and the row count in SALES must be more than 1000.

The repetitive aspect of sub-scheduler processing according to embodiments of the present invention for ETL processing steps with more than one dependent condition is further explained by use of the following segment of pseudocode:

In this example, the condition records for the ETL processing step identified by thisStepID are gathered by:
conditionRecords=findConditions(select condID, condTypeID from DEPENDCONDS where stepID=thisStepID group by condID, condTypeID)

The parameter records for a type of dependent condition are gathered by:
paramRecords=findParams(select paramID, paramValue from DEPENDCONDS where stepID equals thisStepID and condID equals thisCondID);

In this example, conditionChecker( ) takes as call parameters an identification of a condition type and a list of parameters for dependent conditions of that type:
satisfied=conditionChecker(thisCondType, paramRecords);

In this example, it is the conditionchecker( ) function that carries out the actual work of comparing the dependent conditions with pertinent ETL data or condition parameters.

Figure 4:
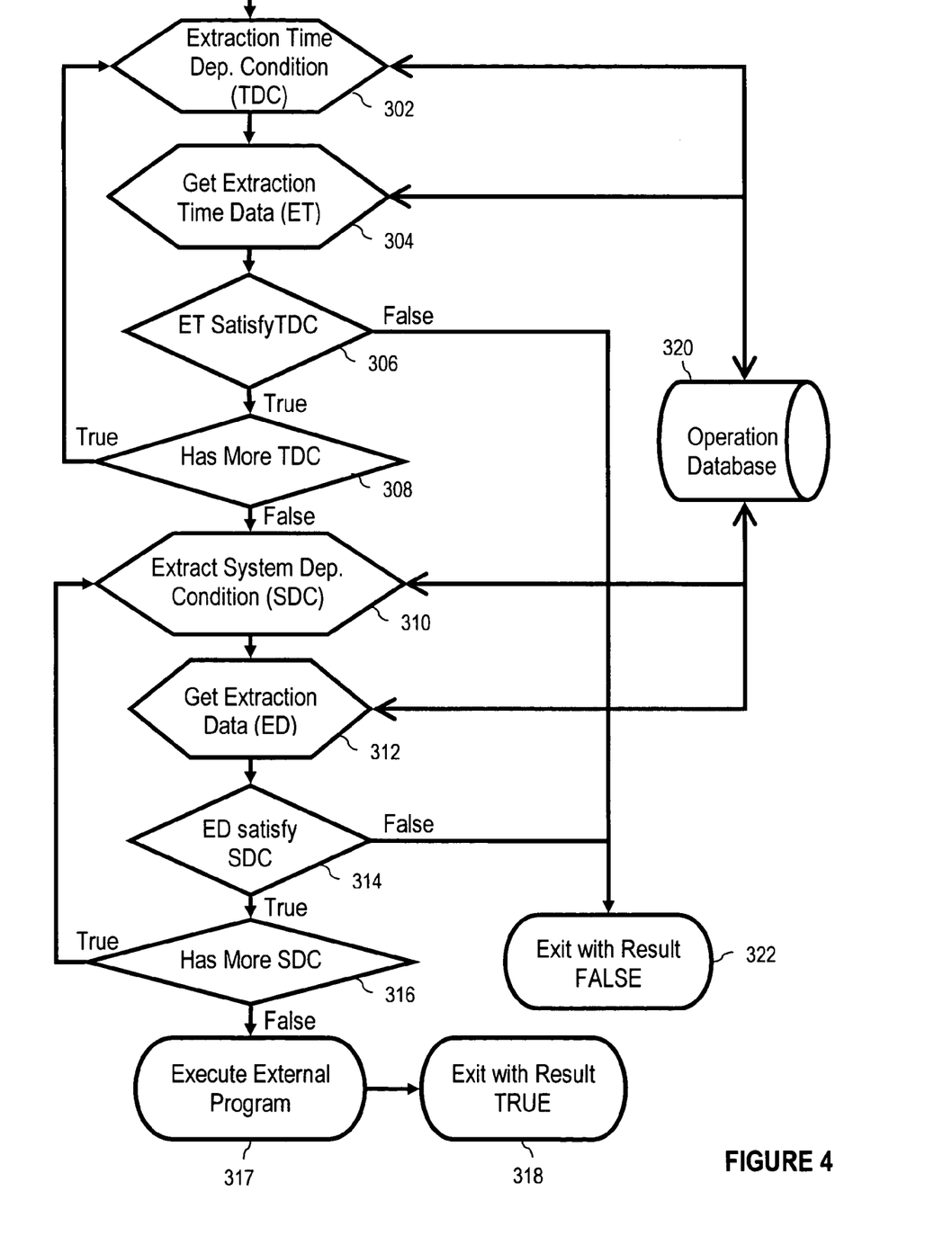
FIG. 4 sets forth sets forth a data flow diagram illustrating an exemplary method for providing flexibility in scheduling control for an ETL scheduler in a data warehouse system where dependent conditions include both time dependent conditions and system dependent conditions.

By way of further explanation, FIG. 4 sets forth sets forth a data flow diagram illustrating an exemplary method for providing flexibility in scheduling control for an ETL scheduler in a data warehouse system where dependent conditions include both time dependent conditions and system dependent conditions. The method of FIG. 4 illustrates processing for an ETL processing step that benefits from the added flexibility according to embodiments of the present invention. The method of FIG. 4 begins with extracting (302) a time dependent condition from computer memory of the data warehouse system, here exemplified as an operations database (320). The method of FIG. 4 includes extracting (304) related extract time data from the operation database for the extracted time dependent condition.

The method of FIG. 4 continues with determining (306) whether the time data satisfies the given condition, and, if it does not satisfy the given condition, exiting (322) and returning a FALSE condition. So long as there remain in the operation database additional time dependent conditions for the pertinent ETL processing step (308), the method of FIG. 4 continues to repeatedly execute the steps of extracting (302) a time dependent condition, extracting (304) related

```
stepID thisStepID = StepID_of_Current_ETL_Processing_Step;
conditionRecordList conditionRecords;
ParamRecordList = paramRecords;
Integer thisCondID;
Integer thisCondType;
Integer index=0;
ConditionIdentification thisCondID;
boolean satisfied = true;
conditionRecords = findConditions(select condID, condTypeID from DEPENDCONDS
     where stepID= thisStepID group by condID, condTypeID)
while(conditionRecords.condID[index] &&
        index < conditionRecords.numOfConditions &&
        satisfied) {
    thisCondID = conditionRecords.condID[index];
    thisCondType = conditionRecords.condTypeID[index];
    paramRecords = findParams(select paramID, paramValue from
        DEPENDCONDS where stepID equals thisStepID and
        condID equals thisCondID);
    satisfied = conditionChecker(paramRecords, thisCondType);
    index++;
}
if(satisfied) {
    // execute the external program for the current ETL processing step
    system(externalProgram);
    return(TRUE):
}
else return(FALSE);
``` extract time data, and determining (306) whether the time data satisfies the present time dependent condition.

When there are no more time dependent conditions for the pertinent ETL processing step, the method of FIG. 4 continues by extracting (310) a system dependent condition from the operation database, extracting (312) related extract system data from the operation database for the extracted system dependent condition, and determining (314) whether the system data satisfies the system dependent condition. If the system data does not satisfy the system dependent condition, the method exits (322) issues a FALSE return condition. So long as there remain in the operation database additional system dependent conditions for the pertinent ETL processing step (316), the method of FIG. 4 continues to repeatedly execute the steps of extracting (310) a system dependent condition from the operation database, extracting (312) related extract system data from the operation database for the extracted system dependent condition, and determining (314) whether the system data satisfies the system dependent condition.

When there are no more system dependent conditions for the pertinent ETL processing step, the method of FIG. 4 continues by executing (317) an external program that carries out the actual data processing for the pertinent ETL processing step. The method of FIG. 4 then exits (318), returning 'TRUE.' In this example, the method executes an external program, exits, and returns TRUE when all dependent condition for an ETL processing steps, both all time dependent conditions and all system dependent conditions, are determined to be satisfied by extracted time data or extracted system data. If any dependent conditions, either a time dependent condition or a system dependent condition, for the ETL processing step is determined to be not satisfied by related extracted data, then the method exits and returns FALSE.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for providing flexibility in scheduling control for an extract, transfer, and load ("ETL") scheduler in a data warehouse system, the method comprising:
   extracting from a computer memory of the data warehouse system a dependent condition for a scheduled ETL processing step of the ETL scheduler;
   extracting from computer memory related ETL data for the dependent condition;
   determining whether the ETL data satisfies the dependent condition; and
   executing the scheduled step if the ETL data satisfies the dependent condition.

2. The method of claim 1 wherein steps of the method are carried out through a sub-scheduler implemented as an interface between the ETL scheduler and external programs without modification of the ETL scheduler.

3. The method of claim 1 wherein:
   the ETL scheduler comprises a multiplicity of scheduled ETL processing steps,
   the computer memory of the data warehouse system comprises dependent conditions for at least one of the scheduled ETL processing steps and ETL data related to at least one dependent condition, and
   the method further comprises repeating, for each dependent condition for each scheduled ETL processing step for which the operations database has at least one dependent condition, the steps of:
   extracting from computer memory a dependent condition for a scheduled ETL processing step of the ETL scheduler;
   extracting from computer memory related ETL data for the dependent condition;
   determining whether the ETL data satisfies the dependent condition; and
   executing the scheduled step if the ETL data satisfies the dependent condition.

4. The method of claim 1 further comprising storing ETL data in computer memory.

5. The method of claim 1 wherein the dependent condition comprises a time dependent condition.

6. The method of claim 1 wherein the dependent condition comprises a system dependent condition.

7. The method of claim 1 wherein the related ETL data comprises extract time data.

8. The method of claim 1 wherein the related ETL data comprises extract system data.

9. A system for providing flexibility in scheduling control for an extract, transfer, and load ("ETL") scheduler in a data warehouse system, the system comprising:
   means for extracting from a computer memory of the data warehouse system a dependent condition for a scheduled ETL processing step of the ETL scheduler;
   means for extracting from computer memory related ETL data for the dependent condition;
   means for determining whether the ETL data satisfies the dependent condition; and
   means for executing the scheduled step if the ETL data satisfies the dependent condition.

10. The system of claim 9 further comprising a sub-scheduler implemented as an interface between the ETL scheduler and external programs without modification of the ETL scheduler.

11. The system of claim 9 wherein:
   the ETL scheduler comprises a multiplicity of scheduled ETL processing steps,
   the computer memory of the data warehouse system comprises dependent conditions for at least one of the scheduled ETL processing steps and ETL data related to at least one dependent-condition, and
   the system further comprises means for repeating, for each dependent condition for each scheduled ETL processing step for which the operations database has at least one dependent condition,
   means for extracting from computer memory a dependent condition for a scheduled ETL processing step of the ETL scheduler;
   means for extracting from computer memory related ETL data for the dependent condition;
   means for determining whether the ETL data satisfies the dependent condition; and
   means for executing the scheduled step if the ETL data satisfies the dependent condition.

12. The system of claim 9 further comprising means for storing ETL data in computer memory.

13. The system of claim 9 wherein the dependent condition comprises a time dependent condition.

14. The system of claim 9 wherein the dependent condition comprises a system dependent condition.

15. The system of claim 9 wherein the related ETL data comprises extract time data.

16. The system of claim 9 wherein the related ETL data comprises extract system data.

17. A computer program product for providing flexibility in scheduling control for an extract, transfer, and load ("ETL") scheduler in a data warehouse system, the computer program product comprising:
   a recording medium;
   means, recorded on the recording medium, for extracting from a computer memory of the data warehouse system a dependent condition for a scheduled ETL processing step of the ETL scheduler;
   means, recorded on the recording medium, for extracting from computer memory related ETL data for the dependent condition;
   means, recorded on the recording medium, for determining whether the ETL data satisfies the dependent condition; and
   means, recorded on the recording medium, for executing the scheduled step if the ETL data satisfies the dependent condition.

18. The computer program product of claim 17 further comprising a sub-scheduler implemented as an interface between the ETL scheduler and external programs without modification of the ETL scheduler.

19. The computer program product of claim 17 wherein:
   the ETL scheduler comprises a multiplicity of scheduled ETL processing steps,
   the computer memory of the data warehouse system comprises dependent conditions for at least one of the scheduled ETL processing steps and ETL data related to at least one dependent condition, and
   the computer program product further comprises means, recorded on the recording medium, for repeating, for each dependent condition for each scheduled ETL processing step for which the operations database has at least one dependent condition,
   means, recorded on the recording medium, for extracting from computer memory a dependent condition for a scheduled ETL processing step of the ETL scheduler;
   means, recorded on the recording medium, for extracting from computer memory related ETL data for the dependent condition;
   means, recorded on the recording medium, for determining whether the ETL data satisfies the dependent condition; and
   means, recorded on the recording medium, for executing the scheduled step if the ETL data satisfies the dependent condition.

20. The computer program product of claim 17 further comprising means, recorded on the recording medium, for storing ETL data in computer memory.

21. The computer program product of claim 17 wherein the dependent condition comprises a time dependent condition.

22. The computer program product of claim 17 wherein the dependent condition comprises a system dependent condition.

23. The computer program product of claim 17 wherein the related ETL data comprises extract time data.

24. The computer program product of claim 17 wherein the related ETL data comprises extract system data.

* * * * *